United States Patent
Finley et al.

(10) Patent No.: US 8,085,460 B2
(45) Date of Patent: Dec. 27, 2011

(54) ELECTROCHROMIC DEVICE

(75) Inventors: James J. Finley, Pittsburgh, PA (US); Irina G. Schwendeman, Wexford, PA (US); Adam D. Polcyn, Pittsburgh, PA (US); Caroline S. Harris, Pittsburgh, PA (US)

(73) Assignee: PPG Industries Ohio, Inc, Cleveland, OH (US)

( * ) Notice: Subject to any disclaimer, the term of this patent is extended or adjusted under 35 U.S.C. 154(b) by 0 days.

(21) Appl. No.: 12/545,410

(22) Filed: Aug. 21, 2009

(65) Prior Publication Data

US 2010/0053722 A1    Mar. 4, 2010

Related U.S. Application Data

(60) Provisional application No. 61/092,461, filed on Aug. 28, 2008.

(51) Int. Cl.
   *G02F 1/15*    (2006.01)
   *G09G 3/19*    (2006.01)

(52) U.S. Cl. .......................... 359/265; 345/49

(58) Field of Classification Search .......... 359/265–275, 359/277, 245–247, 254, 242; 345/49, 105; 250/70; 438/929
   See application file for complete search history.

(56) References Cited

U.S. PATENT DOCUMENTS

| | | |
|---|---|---|
| 4,610,771 A | 9/1986 | Gillery |
| 4,716,086 A | 12/1987 | Gillery et al. |
| 4,746,347 A | 5/1988 | Sensi |
| 4,792,536 A | 12/1988 | Pecoraro et al. |
| 4,806,220 A | 2/1989 | Finley |
| 4,834,857 A | 5/1989 | Gillery |
| 4,898,789 A | 2/1990 | Finley |
| 4,898,790 A | 2/1990 | Finley |
| 4,902,580 A | 2/1990 | Gillery |
| 4,948,677 A | 8/1990 | Gillery |
| 5,028,759 A | 7/1991 | Finley |
| 5,030,593 A | 7/1991 | Heithoff |
| 5,030,594 A | 7/1991 | Heithoff |
| 5,059,295 A | 10/1991 | Finley |
| 5,240,886 A | 8/1993 | Gulotta et al. |
| 5,385,872 A | 1/1995 | Gulotta et al. |

(Continued)

FOREIGN PATENT DOCUMENTS

DE       29 09 359 A1    9/1979

OTHER PUBLICATIONS

PCT Search Report, PCT/US2009/054831, dated Oct. 22, 2009.

*Primary Examiner* — Dawayne Pinkney
(74) *Attorney, Agent, or Firm* — Andrew C. Siminerio

(57) ABSTRACT

An electrochromic device includes a first substrate spaced from a second substrate. A first conductive member is formed over at least a portion of the first substrate. A first electrochromic electrode comprising a tungsten oxide coating is formed over at least a portion of the first conductive member. A second conductive member is formed over at least a portion of the second substrate. A second electrochromic electrode is formed over at least a portion of the second conductive member. An ionic liquid is positioned between the first electrode and the second electrode. In one aspect of the invention, the ionic liquid can include nanoparticles of metals or metal oxides. In a further aspect of the invention, the second conductive member and second electrode can be formed by a single material.

8 Claims, 2 Drawing Sheets

U.S. PATENT DOCUMENTS

| | | | |
|---|---|---|---|
| 5,393,593 A | 2/1995 | Gulotta et al. | |
| 5,724,187 A | 3/1998 | Varaprasad et al. | |
| 5,821,001 A | 10/1998 | Arbab et al. | |
| 6,495,251 B1 | 12/2002 | Arbab et al. | |
| 6,667,825 B2 | 12/2003 | Lu et al. | |
| 6,828,062 B2 | 12/2004 | Lu et al. | |
| 7,785,496 B1 * | 8/2010 | Shim et al. | 252/500 |
| 2005/0025700 A1 * | 2/2005 | Bulian et al. | 423/606 |
| 2005/0104136 A1 | 5/2005 | Edwards et al. | |
| 2006/0203322 A1 | 9/2006 | Radmard et al. | |

* cited by examiner

ELECTROCHROMIC DEVICE

CROSS REFERENCE TO RELATED APPLICATIONS

This application claims priority to U.S. provisional Application No. 61/092,461 filed Aug. 28, 2008, herein incorporated by reference in its entirety.

BACKGROUND OF THE INVENTION

1. Field of the Invention

The present invention relates generally to electrochromic devices and, in one particular aspect, to an electrochromic device utilizing a tungsten oxide electrode and an ionic liquid having nanoparticles.

2. Description of the Current Technology

Electrochromic devices utilize electrochromic materials that darken and lighten upon the application of an electrical potential. These electrochromic devices are finding more acceptance in various areas of commercial activity, such as architectural windows and vehicle windows.

It is an object of the present invention to provide an electrochromic device having advantages over electrochromic devices currently available.

SUMMARY OF THE INVENTION

An electrochromic device comprises a first substrate spaced from a second substrate. A first conductive member is formed over at least a portion of the first substrate. A first electrochromic electrode comprising tungsten oxide is formed over at least a portion of the first conductive member. A second conductive member is formed over at least a portion of the second substrate. A second electrochromic electrode is formed over at least a portion of the second conductive member. An ionic liquid is positioned between the first electrode and the second electrode. In one aspect of the invention, the ionic liquid can include nanoparticles of metals or metal oxides. In a further aspect of the invention, the second conductive member and second electrochromic electrode can be formed by a single material, e.g., a single layer of a conductive metal oxide.

In a particular aspect of the invention, an electrochromic device comprises a first glass substrate spaced from a second glass substrate. A first conductive member comprising at least one conductive metal oxide or a multi-layer structure comprising metal oxide/metal/metal oxide is formed over at least a portion of the first substrate. A first electrochromic electrode comprising tungsten oxide is formed over at least a portion of the first conductive member and has a thickness in the range of 200 nm to 300 nm. A second conductive member is formed over at least a portion of the second substrate and comprises at least one conductive metal oxide or a multi-layer structure comprising metal oxide/metal/metal oxide. A second electrochromic electrode comprising at least one of a conductive metal oxide or a conductive polymer is formed over at least a portion of the second conductive member. An ionic liquid is positioned between the first and second electrodes and includes nanoparticles

BRIEF DESCRIPTION OF THE DRAWINGS

The invention will be described with reference to the attached drawing figures wherein the reference numbers identify like parts throughout.

DESCRIPTION OF THE PREFERRED EMBODIMENTS

Figure 1:
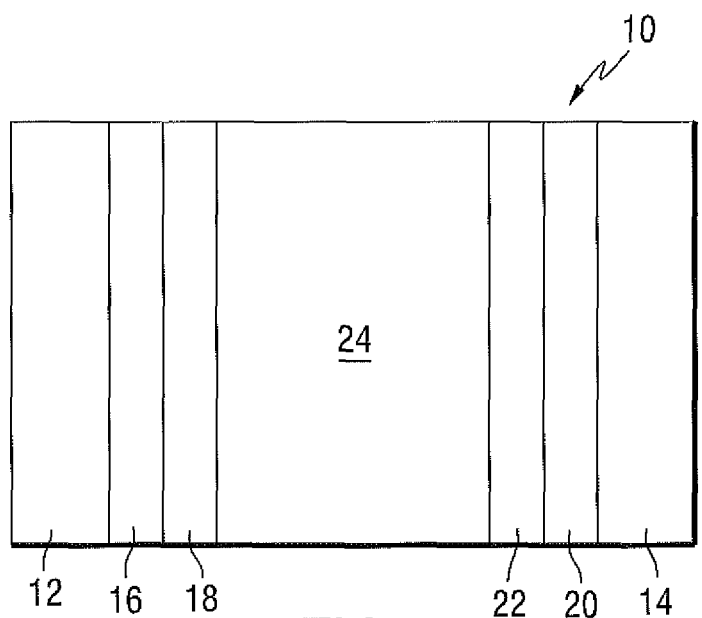
FIG. 1 is a side view (not to scale) of an electrochromic device incorporating features of the invention.

As used herein, spatial or directional terms, such as "left", "right", "inner", "outer", "above", "below", and the like, relate to the invention as it is shown in the drawing figures. However, it is to be understood that the invention can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. Further, as used herein, the terms "formed over", "deposited over", or "provided over" mean formed, deposited, or provided on but not necessarily in contact with the surface. For example, a coating layer "formed over" a substrate does not preclude the presence of one or more other coating layers or films of the same or different composition located between the formed coating layer and the substrate. As used herein, the terms "polymer" or "polymeric" include oligomers, homopolymers, copolymers, and terpolymers, e.g., polymers formed from two or more types of monomers or polymers. The terms "visible region" or "visible light" refer to electromagnetic radiation having a wavelength in the range of 380 nm to 800 nm. The terms "infrared region" or "infrared radiation" refer to electromagnetic radiation having a wavelength in the range of greater than 800 nm to 100,000 nm. The terms "ultraviolet region" or "ultraviolet radiation" mean electromagnetic energy having a wavelength in the range of 300 nm to less than 380 nm. Additionally, all documents, such as but not limited to issued patents and patent applications, referred to herein are to be considered to be "incorporated by reference" in their entirety. As used herein, silicon is considered to be a "metal".

An electrochromic device 10 incorporating features of the invention is illustrated in FIG. 1. The device 10 includes a first substrate 12 spaced from a second substrate 14. A first conductive member 16 is formed over at least a portion of the first substrate 12. A first electrochromic electrode 18 is formed over at least a portion of the first conductive member 16. A second conductive member 20 is formed over at least a portion of the second substrate 14. A second electrochromic electrode 22 is formed over at least a portion of the second conductive member 20. A conductive medium, such as an ionic liquid 24, is positioned between the first electrode 18 and the second electrode 22.

The substrates 12 and 14 can be of any desired material. In the broad practice of the invention, the substrates 12, 14 can be of the same or different materials. The substrates 12, 14 can include any desired material having any desired characteristics. For example, one or more of the substrates 12, 14 can be transparent or translucent to visible light. By "transparent" is meant having visible light transmission of greater than 0% to 100%. Alternatively, one or more of the substrates 12, 14 can be translucent. By "translucent" is meant allowing electromagnetic energy (e.g., visible light) to pass through but diffusing this energy such that objects on the side opposite the viewer are not clearly visible. Examples of suitable materials include, but are not limited to, plastic substrates (such as acrylic polymers, such as polyacrylates or stretched acrylic; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); ceramic substrates; glass substrates; or mixtures or combinations of any of the above. For example, one or more of the substrates 12, 14 can include conventional soda-lime-silicate glass, borosilicate glass, or leaded glass. The glass can be clear glass. By "clear glass" is meant non-tinted or non-colored glass. Alternatively, the glass can be tinted or otherwise colored glass. The glass can be annealed or heat-treated glass. As used herein, the term "heat treated" means tempered or at least partially tempered. The glass can be of any type, such as conventional float glass, and can be of any composition having any optical properties, e.g., any value of visible transmission, ultraviolet transmission, infrared transmission, and/or total solar energy transmission. The first and second substrates 12, 14 can each be, for example, clear float glass or can be tinted or colored glass or one substrate 12, 14 can be clear glass and the other substrate 12, 14 colored glass. Although not limiting to the invention, examples of glass suitable for the invention are described in U.S. Pat. Nos. 4,746,347; 4,792,536; 5,030,593; 5,030,594; 5,240,886; 5,385,872; and 5,393,593. The first and second substrates 12, 14 can be of any desired dimensions, e.g., length, width, shape, or thickness. Non-limiting examples of glass that can be used for the practice of the invention include clear glass, Starphire®, Solargreen®, Solextra®, GL-20®, GL-35™, Solarbronze®, and Solargray® glass, all commercially available from PPG Industries Inc. of Pittsburgh, Pa.

The first and second conductive members 16, 20 can be the same or different from each other. Examples of materials useful for the invention include conductive metal strips or conductive coatings. For example, the conductive members 16, 20 can be formed by any transparent conductive oxide or a multi-layer conductive structure such as metal oxide/metal/metal oxide coating. Examples of transparent conductive materials useful for the invention include, but are not limited to, oxides of silicon, aluminum, zirconium, tin, indium, or mixtures thereof; nitrides; carbides; or oxycarbides. For example, one or both of the conductive members 16, 20 can be indium tin oxide or fluorine doped tin oxide. Examples of multi-layer structures include coatings having one or more metallic films positioned between dielectric layers. Examples of suitable dielectric layers include metal or non-metal oxides, nitrides, oxynitrides, or mixtures thereof. The metallic film can be a noble metal, such as silver, gold, copper, or combinations or alloys thereof. Examples of such coatings include the Solarban® and Sungate® families of coatings commercially available from PPG Industries, Inc. Specific coatings useful for the invention include Solarban® 60, Solarban® 70 and Sungate® 100 coatings. Examples of suitable coatings are found, for example but not to be considered as limiting, in U.S. Pat. Nos. 4,898,789; 5,821,001; 4,716,086; 4,610,771; 4,902,580; 4,716,086; 4,806,220; 4,898,790; 4,834,857; 4,948,677; 5,059,295; and 5,028,759, and also in U.S. patent application Ser. No. 09/058,440.

The first electrochromic electrode 18 comprises a tungsten oxide ($WO_3$) coating applied over at least a portion of the first conductive member 16. For example, a tungsten oxide coating can be sputtered deposited over 5 ohm/square indium tin oxide on a glass substrate. For example, the tungsten oxide coating can have a thickness in the range of 200 nanometers (nm) to 300 nm.

The second electrochromic electrode 22 can be a conductive metal or metal oxide. In one non-limiting embodiment, the second electrode 22 and the second conductive member 20 are both formed by a conductive metal oxide, such as but not limited to indium tin oxide. In this embodiment, the second conductive member 20 and second electrode 22 can be formed by two layers of indium tin oxide or, alternatively, a single layer of indium tin oxide can act as both the second conductive member 20 and second electrode 22. In another non-limiting embodiment, the second electrode 22 can be formed by a conductive conjugated polymer. Examples of conjugated polymers are found, not limited to, U.S. Pat. Nos. 6,667,825 and 6,828,062.

The ionic liquid 24 can be any conventional ionic liquid. Examples of ionic liquids useful in the practice of the invention are found in U.S. Pat. Nos. 6,667,825 and 6,828,062. In one particular embodiment, the ionic liquid 24 can be [BMIM] $PF_6$ (1-butyl-3-methylimidazolium hexafluorophosphate). For example, the ionic liquid 24 can include nanoparticles to improve the uniformity and contrast of the electrochromic device 10 of the invention over conventional electrochromic devices. The nanoparticles can be produced by sputter-depositing the material in the ionic liquid 24. Examples of nanoparticles useful for the invention include, but are not limited to, tungsten oxide nanoparticles and/or zinc oxide nanoparticles.

EXAMPLE

Figure 2:
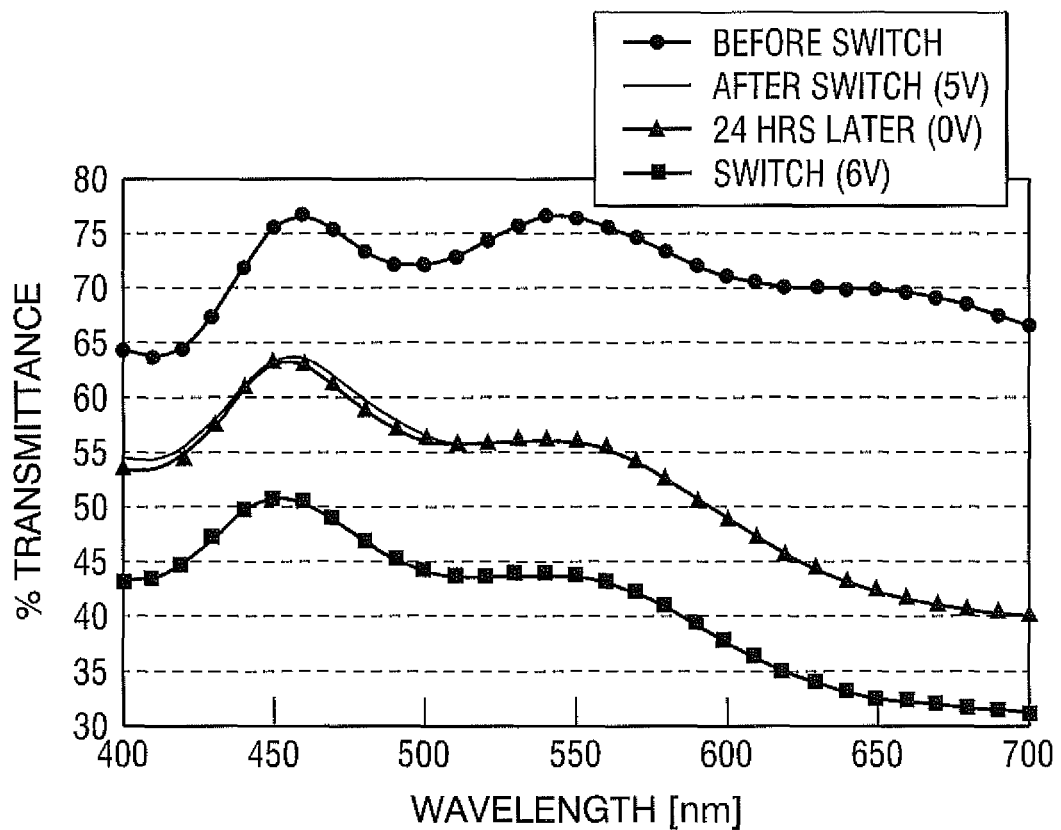
FIG. 2 is a graph of % transmittance versus wavelength (nm) for electrochromic devices of the invention.

Electrochromic devices (cells) as described above were fabricated. The cells utilized a first electrode of tungsten oxide over indium tin oxide; a second electrode of indium tin oxide, and an ionic liquid of [BMIM] $PF_6$ with tungsten oxide and zinc oxide nanoparticles. The top line in FIG. 2 shows the transmittance before any electrical potential was applied. As shown in FIG. 2, after a 5 volt charge was applied, the transmittance dropped. The electrical current was then turned off. After a twenty-four hour period, the transmittance remained about the same. The bottom line in FIG. 2 shows that when a higher voltage was applied (6 volts), the transmittance dropped more than when the 5 volt current was applied.

Tables 1-6 list the spectral/color data as measured in accordance with the noted conventional measurement parameters. Tables 1 and 2 list the color data measured at (A/2°) and (D65/2°), respectively. The data for the standard (STD) and for Trial 3 were before the current was applied. The data for Trials 1 and 2 were after the 5 volt current was applied.

TABLE 1

| | A/2° | | | | |
|---|---|---|---|---|---|
| Trial # | X | Y | Z | x | y |
| STD | 109.8376 | 99.9912 | 35.5851 | 0.4476 | 0.4074 |
| 1 | 51.7416 | 49.9855 | 20.8951 | 0.422 | 0.4076 |
| 2 | 54.2334 | 52.2338 | 21.5938 | 0.4235 | 0.4079 |
| 3 | 78.9874 | 73.4662 | 26.1237 | 0.4423 | 0.4114 |

TABLE 2

| | D65/2° | | | | |
|---|---|---|---|---|---|
| Trial # | X | Y | Z | x | y |
| STD | 95.0405 | 99.9946 | 108.8762 | 0.3127 | 0.329 |
| 1 | 47.3807 | 51.4858 | 64.2198 | 0.2905 | 0.3157 |
| 2 | 49.4671 | 53.7152 | 66.2749 | 0.2919 | 0.317 |
| 3 | 68.9061 | 74.0055 | 79.5755 | 0.3097 | 0.3326 |

Tables 3 and 4 list the color data at (D65/10°) and (CWF/10°), respectively. The data for the standard was without any current. The data for Trial 4 was for a cell of the invention measured 24 hours after a 5 volt current had been applied and then turned off.

TABLE 3

| | D65/10° | | | | |
|---|---|---|---|---|---|
| Trial # | L* | a* | b* | C* | h° |
| STD | 99.9973 | 0.0066 | −0.0092 | 0.0113 | 305.5968 |
| 4 | 78.4785 | −4.5462 | −6.1013 | 7.6088 | 233.3092 |

TABLE 4

| | CWF/10° | | | | |
|---|---|---|---|---|---|
| Trial # | L* | a* | b* | C* | h° |
| STD | 99.9981 | −0.0068 | −0.0028 | 0.0074 | 202.6488 |
| 4 | 78.1855 | −3.5562 | −6.471 | 7.3837 | 241.2086 |

Tables 5 and 6 list the color data at (D65/2°) and (CWF/2°), respectively. The data for the standard and Trial 6 were measured before any voltage was applied. The data for Trial 5 was measured after a current of 6 volts was applied.

TABLE 5

| | D65/2° | | | | |
|---|---|---|---|---|---|
| Trial # | X | Y | Z | x | y |
| STD | 95.0472 | 99.996 | 108.9031 | 0.3127 | 0.329 |
| 5 | 38.499 | 41.8131 | 52.8576 | 0.2891 | 0.314 |
| 6 | 95.0336 | 99.9805 | 108.897 | 0.3127 | 0.329 |

TABLE 6

| | CWF/2° | | | | |
|---|---|---|---|---|---|
| Trial # | X | Y | Z | x | y |
| STD | 99.1884 | 100.0015 | 67.4097 | 0.3721 | 0.3751 |
| 5 | 40.074 | 41.4942 | 32.7359 | 0.3506 | 0.363 |
| 6 | 99.174 | 99.9848 | 67.404 | 0.372 | 0.3751 |

Figure 3:
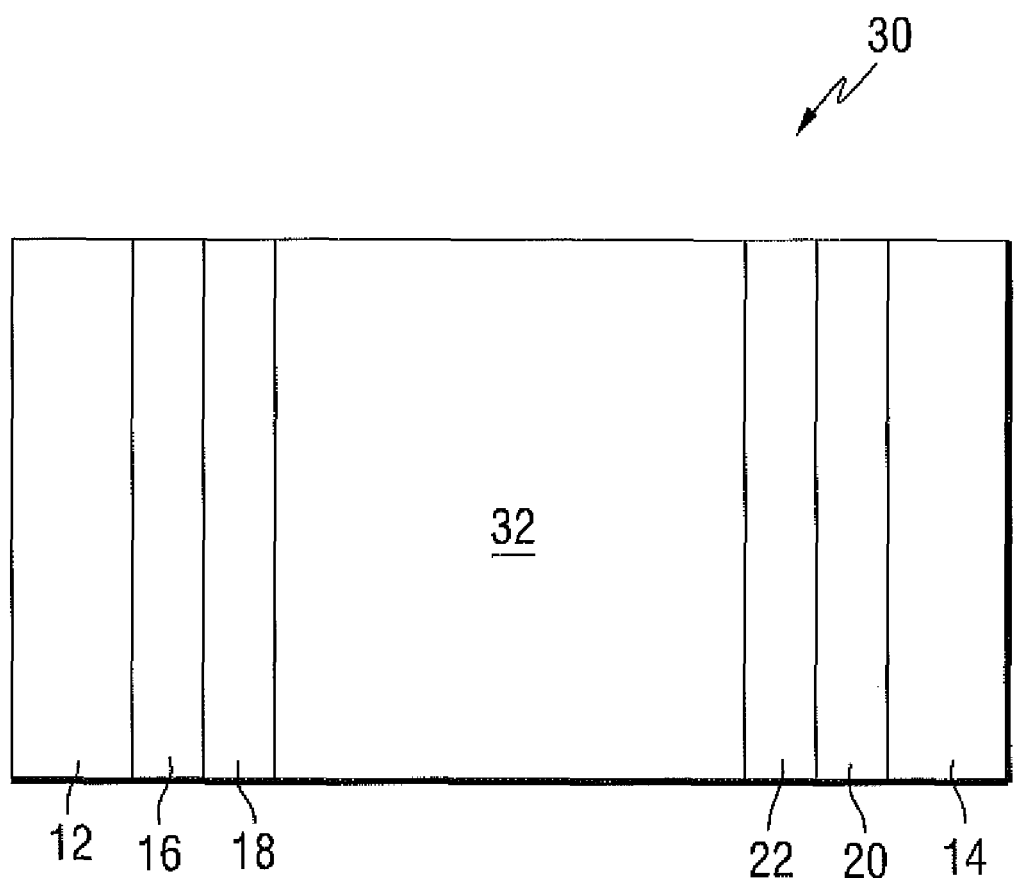
FIG. 3 is a side view (not to scale) of another electrochromic device incorporating features of the invention.

Another electrochromic device 30 is shown in FIG. 3. In this embodiment, one or both of the electrodes 18, 22 can be a conductive conjugated polymer having tungsten oxide particles mixed in or contained in the polymer matrix. Examples of conductive polymers include poly(acetylene)s, poly(pyrrole)s poly(thiophene)s, poly(aniline)s, poly(thiophene)s, poly(p-phenylene sulfide) and poly(para-phenylene vinylene)s (PPB). The tungsten oxide particles can be mixed in the polymer or can be mixed with the monomers and subsequent polymerized to form a polymeric layer. The resultant polymer can be flow coated, spray deposited, or electrode deposited over the conductive members.

Rather than simply an ionic liquid as described above, the conductive medium 32 in FIG. 3 can be a porous membrane that contains an electrolytic liquid but allows the transport of cations and anions in the liquid. The membrane can advantageously provide a structure that acts as a scaffold to provide mechanical support while allowing free movement of the liquid. Pore sizes in the porous membrane can range from nanometer scale to hundreds of micrometers. The refractive index of the material membrane can be selected to be the same or about the same as the refractive index of the electrolyte. By matching the refractive index of the liquid and the membrane, the membrane will appear invisible to the eye and will not scatter light, which could lead to a hazy appearance. Also, the membrane acts as a spacer between the electrodes, instead of using small spheres or rods to serve as spacers as is common in the art. To prevent shorting between the electrodes, it is desirable that the membrane be a good electrical insulator. it is also desirable that the membrane is chemically compatible with the electrolyte to prevent chemical attack. membranes can be constructed from polymers and/or inorganic compositions tailored for specific applications. One example of a suitable material for the membrane is an acrylic polymer to form an acrylic matrix. Common liquid electrolytes, such as viologens, bridged dyes, and ionic liquids can be used.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. An electrochromic device, comprising:
   a first substrate spaced from a second substrate;
   a first conductive member formed over at least a portion on the first substrate;
   a first electrochromic electrode comprising a tungsten oxide coating formed over at least a portion of the first conductive member;
   a second conductive member formed over at least a portion of the second substrate;
   a second electrochromic electrode formed over at least a portion of the second member; and
   a conductive medium positioned between the first electrochromic electrode and the second electrochromic electrode, wherein the conductive medium consists of an ionic liquid, and nanoparticles selected from the group consisting of zinc oxide nanoparticles, tungsten oxide nanoparticles, and combinations thereof,
   wherein the second conductive member and the second electrochromic electrode are formed by a single coating layer of indium tin oxide.

2. The device of claim 1, wherein the first substrate and the second substrate each comprise glass.

3. The device of claim 1, wherein the first conductive member comprises indium tin oxide.

4. The device of claim 1, wherein the tungsten oxide coating has a thickness in the range of 200 nm to 300 nm.

5. The device of claim 1, where the first conductive member comprises a multi-layer structure.

6. An electrochromic device, comprising:
- a first glass substrate spaced from a second glass substrate;
- a first conductive member formed over at least a portion of the first substrate and comprising at least one of a conductive metal oxide or a multi-layer structure comprising metal oxide/metal/metal oxide;
- a first electrochromic electrode comprising a tungsten oxide coating formed over at least a portion of the first conductive member and having a thickness in the range of 200 nm to 300 nm;
- a second conductive member formed over at least a portion of the second substrate and comprising at least one of a conductive metal oxide or a multi-layer structure comprising metal oxide/metal/metal oxide;
- a second electrochromic electrode formed over at least a portion of the second conductive member and comprising at least one of a conductive metal oxide or a conductive polymer; and
- a conductive medium positioned between the first electrochromic electrode and the second electrochromic electrode, wherein the conductive medium consists of an ionic liquid, and nanoparticles selected from the group consisting of zinc oxide nanoparticles, tungsten oxide nanoparticles, and combinations thereof.

7. The electrochromic device of claim 6, wherein said first conductive member comprises said multi-layer structure comprising metal oxide/metal/metal oxide, and said second conductive member comprises said multi-layer structure comprising metal oxide/metal/metal oxide.

8. An electrochromic device, comprising:
- a first glass substrate spaced from a second glass substrate;
- a first conductive member formed over at least a portion of the first substrate and comprising at least one of a conductive metal oxide or a multi-layer structure comprising metal oxide/metal/metal oxide;
- a first electrochromic electrode comprising a tungsten oxide coating formed over at least a portion of the first conductive member and having a thickness in the range of 200 nm to 300 nm;
- a second conductive member formed over at least a portion of the second substrate and comprising at least one of a conductive metal oxide or a multi-layer structure comprising metal oxide/metal/metal oxide;
- a second electrochromic electrode formed over at least a portion of the second conductive member and comprising at least one of a conductive metal oxide or a conductive polymer; and
- a conducive medium positioned between the first electrochromic electrode and the second electrochromic electrode, wherein said conductive medium comprises, a porous membrane containing an ionic liquid comprising nanoparticles selected from zinc oxide nanoparticles, tungsten oxide nanoparticles, and combinations thereof.

* * * * *